US012418185B2

(12) United States Patent
Kwong et al.

(10) Patent No.: US 12,418,185 B2
(45) Date of Patent: Sep. 16, 2025

(54) PARALLEL CHARGING OF ELECTRIC MOTORCYCLES

(71) Applicant: Damon Motors Inc., Vancouver (CA)

(72) Inventors: Dominique Kwong, Coquitlam (CA); Jacob Mbila, Surrey (CA)

(73) Assignee: Damon Motors Inc., Vancouver (CA)

( * ) Notice: Subject to any disclaimer, the term of this patent is extended or adjusted under 35 U.S.C. 154(b) by 678 days.

(21) Appl. No.: 17/866,443

(22) Filed: Jul. 15, 2022

(65) Prior Publication Data

US 2024/0022087 A1    Jan. 18, 2024

(51) Int. Cl.
*H02J 7/00* (2006.01)
*B60L 53/16* (2019.01)
*B60L 53/30* (2019.01)

(52) U.S. Cl.
CPC .......... *H02J 7/0013* (2013.01); *B60L 53/16* (2019.02); *B60L 53/305* (2019.02)

(58) Field of Classification Search
CPC ........ H02J 7/0013; B60L 53/305; B60L 53/16
USPC ......................................................... 320/109
See application file for complete search history.

(56) References Cited

U.S. PATENT DOCUMENTS

| | | | | |
|---|---|---|---|---|
| 11,749,998 | B2 * | 9/2023 | Shorten ................. | B60L 53/665 320/108 |
| 2012/0044843 | A1 * | 2/2012 | Levy ................. | H02J 13/00002 370/310 |
| 2012/0231663 | A1 * | 9/2012 | Dozier ................ | G06F 13/4086 439/620.04 |
| 2014/0179164 | A1 * | 6/2014 | Kanamori ............... | B60L 53/65 439/620.21 |
| 2017/0140603 | A1 * | 5/2017 | Ricci ......................... | B60L 5/16 |
| 2020/0376969 | A1 * | 12/2020 | Shorten .................... | B60L 53/60 |
| 2023/0038656 | A1 * | 2/2023 | Salter ..................... | B60L 53/305 |
| 2023/0108029 | A1 * | 4/2023 | Salter ....................... | B60K 1/04 320/109 |
| 2023/0182600 | A1 * | 6/2023 | Salter ....................... | B60P 3/06 701/22 |
| 2023/0208183 | A1 * | 6/2023 | Underhill .............. | H02J 7/0042 307/23 |
| 2023/0234458 | A1 * | 7/2023 | Salter ..................... | B60L 53/16 |
| 2023/0246467 | A1 * | 8/2023 | Salter ..................... | B60L 58/14 320/109 |
| 2023/0246471 | A1 * | 8/2023 | Salter ..................... | B60L 53/67 320/109 |
| 2024/0190276 | A1 * | 6/2024 | Absar ..................... | B60L 50/60 |
| 2024/0424943 | A1 * | 12/2024 | Prasad .................... | B60L 53/64 |

(Continued)

*Primary Examiner* — Suchin Parihar
(74) *Attorney, Agent, or Firm* — Damien G. Loveland; Valuetech Patent Agency Inc.

(57) ABSTRACT

Charging electric vehicles at shared charging stations may involve waiting in line to connect one's vehicle. By allowing multiple motorcycles to charge in parallel at a charging station, better use of the available space can be made and the process can be more efficient for motorcyclists riding in groups. Connectors and cables are configured to connect a chain of motorcycles in parallel to a single charging station. The connectors and cables carry the charging current to each motorcycle and include communication wiring. One motorcycle is deemed a manager motorcycle, which detects the other motorcycles in the chain and initiates charging. Each motorcycle's battery management system controls the amount of charge for its respective battery.

17 Claims, 6 Drawing Sheets

(56) References Cited

U.S. PATENT DOCUMENTS

2025/0112475 A1\* 4/2025 Malik .................... B60L 53/60
2025/0112476 A1\* 4/2025 Malik ................ H01R 13/6397

\* cited by examiner

PARALLEL CHARGING OF ELECTRIC MOTORCYCLES

TECHNICAL FIELD

This application relates to electric vehicles. In particular, it relates to electric motorcycle charging.

BACKGROUND

Charging an electric or plug-in hybrid car sufficiently can take anything from half an hour to several hours, depending on the size of the battery and the charging rate. As more and more vehicles convert to environmentally friendly and economically advantageous electric models, queues of electric vehicles sometimes build up at the charging stations. While the number of electric vehicle charging stations catches up with demand and their design becomes more efficient, users may have to wait for or even forego charging opportunities.

SUMMARY OF INVENTION

The present invention is directed to a method and system for charging multiple motorcycles simultaneously using a single charging station. This is achieved by charging the multiple motorcycles in parallel using parallel charging modules and parallel charging cables carried by the riders. Due to shortages in infrastructure, the need has arisen for smaller vehicles such as motorcycles to double up at the sporadic charging stations as a way of optimizing station usage and reducing unnecessary queues of electric vehicles. While the number of electric vehicle charging stations catches up with demand and their design becomes more efficient, motorcycles are in a favorable position to assist optimizing charging station usage with their smaller profile, smaller battery size, and quicker charging time.

A multi-node charger disclosed herein bridges the gap between the current design of the charging stations and future charging station sufficiency. Up to four motorcycles can simultaneously occupy a single car charging space and share that same electrical flow provided to one car between all of them, using a method by which all four motorcycles can hook up to one charger. For example, motorcycles 10, 12, 14 in FIG. 1 are connected via cables 11, 13, 15 to a single charging station 16. This, in turn, frees up space at other stations for other, larger vehicles to be charged.

In situations in which a single charging station is unoccupied, then the simultaneous charging of multiple motorcycles may reduce the overall time the charging station is occupied compared to charging the motorcycles sequentially. This may be especially useful for motorcycle riders travelling in groups, and it avoids the need for riders of motorcycles arriving together to wait in line. Furthermore, charging each motorcycle slowly, simultaneously, may reduce degradation of the batteries compared to charging each one with a faster charge rate, sequentially.

A parallel charging module for an electric motorcycle comprising: a plug, a first socket and a second socket, wherein each of the plug, the first socket and the second socket has a positive terminal, a negative terminal, a first communication terminal and a second communication terminal; a first electrical connection between the positive terminals of the plug, the first socket and the second socket; a second electrical connection between the negative terminals of the plug, the first socket and the second socket; a third electrical connection between the first communication terminals of the plug, the first socket and the second socket; a fourth electrical connection between the second communication terminals of the plug, the first socket and the second socket; and a switch and a 120 ohm resistor connected in series across the third and fourth electrical connections; wherein the plug is configured to mate with a charging socket on the electric motorcycle, the first socket is configured to mate with a charging station plug, and the switch is operated depending on a type of plug inserted in the second socket.

In some embodiments, the second type of plug defines a notch that is not present in the first type of plug; and a control for the switch fits inside the notch without the switch being operated.

In some embodiments, the parallel charging module is in combination with a parallel charging cable, wherein the parallel charging cable comprises: two further plugs, each one located at an end of the parallel charging cable, wherein each of the further plugs has a further positive terminal, a further negative terminal, a further first communication terminal and a further second communication terminal; a fifth electrical connection between the further positive terminals of the two further plugs; a sixth electrical connection between the further negative terminals of the two further plugs; a seventh electrical connection between the further first communication terminals of the two further plugs; and an eighth electrical connection between the further second communication terminals of the two further plugs; wherein the two further plugs comprise one of the first type and one of the second type.

Also disclosed is a system for charging multiple electric motorcycles in parallel comprising a parallel charging module for each motorcycle and a parallel charging cable for each motorcycle.

Further disclosed is a method for charging multiple electric motorcycles in parallel comprising: detecting, by a first motorcycle, a connection between a charging port of the first motorcycle and a charging station; detecting, by the first motorcycle, a further connection between the first motorcycle and at least one other motorcycle; and instructing, by the first motorcycle, the charging station to initiate charging to the first motorcycle and said at least one other motorcycle.

This summary provides a simplified, non-exhaustive introduction to some aspects of the invention, without delineating the scope of the invention.

BRIEF DESCRIPTION OF DRAWINGS

The following drawings illustrate embodiments of the invention and should not be construed as restricting the scope of the invention in any way.

DESCRIPTION

A. Glossary

BMS—Battery Management System

A CAN (Controller Area Network) or CAN bus refers to the communications protocol and wiring that allows multiple different electronic components in a vehicle to communicate with each other without the use of a central processor. Signals according to this protocol are transmitted on a pair of wires labeled CAN_L and CAN_H.

The term "firmware" includes, but is not limited to, program code and data used to control and manage the interactions between the motorcycles, the charger and the various modules of the system.

The term "hardware" includes, but is not limited to, the physical components of a motorcycle, a parallel charging module, a parallel charging cable, etc.

The term "module" can refer to any component in this invention and to any or all of the features of the invention without limitation. A module may be a software, firmware or hardware module, and may be located in a motorcycle, a user device, a charger or a server.

The term "network" can include both a mobile network and data network without limiting the term's meaning, and includes the use of wireless (e.g. 2G, 3G, 4G, 5G, WiFi™, WiMAX™, Wireless USB (Universal Serial Bus), Zigbee™, Bluetooth™ and satellite), and/or hard wired connections such as for a CAN or PLC (Power Line Communication), and may include connections to flash memory data cards and/or USB memory sticks where appropriate. A network may also mean dedicated connections between computing devices and electronic components, such as buses for intra-chip communications.

The term "PLC" refers to Power Line Communication.

The term "processor" is used to refer to any electronic circuit or group of circuits that perform calculations, and may include, for example, single or multicore processors, multiple processors, an ASIC (Application Specific Integrated Circuit), and dedicated circuits implemented, for example, on a reconfigurable device such as an FPGA (Field Programmable Gate Array). The processor performs at least some of the steps in the flowcharts, whether they are explicitly described as being executed by the processor or whether the execution thereby is implicit due to the steps being described as performed by code or a module. The processor, if comprised of multiple processors, may be located together or geographically separate from each other. The term includes virtual processors and machine instances as in cloud computing or local virtualization, which are ultimately grounded in physical processors.

The term "software" includes, but is not limited to, program code that performs the computations and generates some or all of the control signals necessary for controlling the charging of electric vehicles that are connected together to be charged in parallel from a single charging station.

B. Exemplary Embodiments

Figure 1:
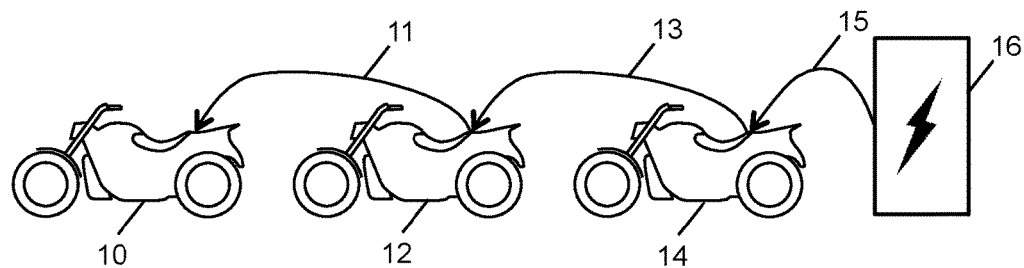
FIG. 1 is a schematic diagram of a group of motorcycles connected to a single charging station, according to an embodiment of the present invention.
Figure 2:
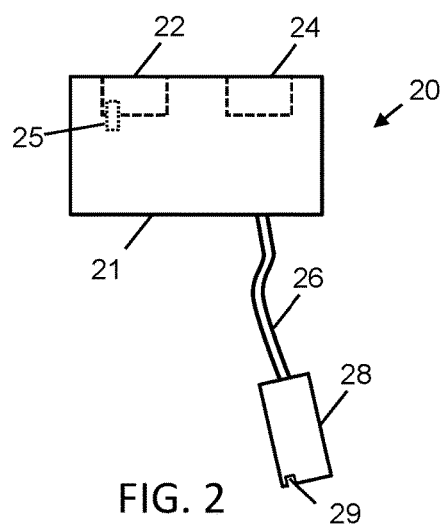
FIG. 2 is a schematic diagram of a parallel charging module, according to an embodiment of the present invention.

Referring to FIG. 2, there is shown an exemplary parallel charging module (hereinafter "connector" for brevity) 20, which is used to connect a given electric motorcycle to (a) two other electric motorcycles, (b) another electric motorcycle and a charging station or (c) another motorcycle. The connector 20 has a body 21 with two sockets 22, 24 which are each configured to mate with a plug on the output of a charging station or a plug on an end of a cable that connects two electric motorcycles together. The sockets 22, 24 are identical, except for a spring-loaded pushbutton 25 (or control) that operates a switch below the floor or end of socket 22 or elsewhere in the body 21 of the connector 20. Depending on the shape of the plug that is inserted into socket 22 in the region of the pushbutton 25, the switch is either operated or not operated. A cable 26 extends from the body 21 of the connector 20 and terminates with a plug 28. The plug 28 is configured to mate with a socket similar to socket 22 but on a motorcycle. The plug 28 has a notch 29 (or recess) in its end face, which allows the plug 28 to be inserted into a socket similar to socket 22, without activating the pushbutton 25. In contrast, the plug 28A (FIG. 5) that is provided on the output of a charging station does not have the notch 29, and when inserted into a socket 22 it activates the pushbutton 25.

In other embodiments, the connector may be formed from interconnected cables terminating in a plug and two sockets, without the body 21. In some embodiments, the cable 26 is not present and the plug 28 is integral with the body 21 as a rigid component.

Figure 3:
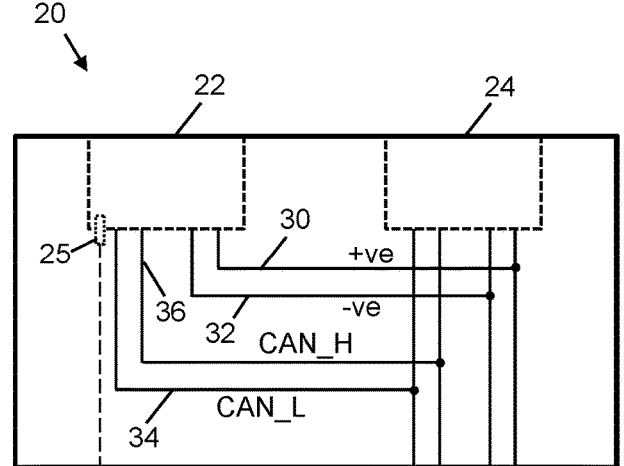
FIG. 3 is a wiring diagram of a parallel charging module, according to an embodiment of the present invention.

FIG. 3 symbolically shows the internal wiring within the body 21, cable 26 and plug of the connector 20. An electrical connection 30 connects the positive terminals of both of the sockets 22, 24 to each other and to the positive terminal of the plug 28. Another electrical connection 32 connects the negative terminals of both of the sockets 22, 24 to each other and to the negative terminal of the plug 28. Another electrical connection 34 connects the CAN_L terminals of both of the sockets 22, 24 to each other and to the CAN_L terminal of the plug 28. Another electrical connection 36 connects the CAN_H terminals of both of the sockets 22, 24 to each other and to the CAN_H terminal of the plug 28. As such, the connector 20 may be considered to be a three-way connector. Notch 29 is described above. Also present is a 120 ohm resistor R1 connected across the CAN_L and CAN_H wires via switch S1 operated by pushbutton 25. The switch S1 is normally open, and when the pushbutton is activated the switch S1 closes to connect R1 across the CAN_L and CAN_H wires. R1 and S1 may be located elsewhere in connector 20 compared to their indicated positions.

Figure 4:
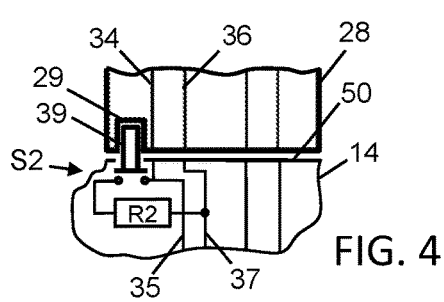
FIG. 4 is a schematic diagram of a plug with a notch mating with a socket in a motorcycle, according to an embodiment of the present invention.

FIG. 4 symbolically shows the end of plug 28 inserted into a motorcycle 14 in a socket similar to socket 22. The wiring at the floor of the socket in the motorcycle is shown. The plug 28 has a CAN_L connection 34 and a CAN_H connection 36, and a recess or notch 29. The notch 29 prevents the plug 28 from activating the pushbutton 39 in the end 50 of the motorcycle socket and closing the switch S2. As such, the resistor R2 is not connected across the CAN_L connection 35 and CAN_H connection 37 in the motorcycle when the plug 28 is inserted.

Figure 5:
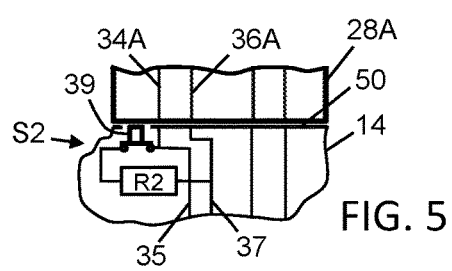
FIG. 5 is a schematic diagram of a plug without a notch mating with a socket in a motorcycle, according to an embodiment of the present invention.

FIG. 5 symbolically shows the end of charging station plug 28A inserted into a motorcycle 14 in a socket similar to socket 22. The wiring at the end of the socket in the motorcycle is shown. The plug 28A has a CAN_L connection 34A and a CAN_H connection 36A, but there is no recess or notch equivalent to notch 29 in the end face of the plug 28. The absence of a notch 29 causes the plug 28A to activate the pushbutton 39 in the end 50 of the motorcycle socket. As such, the switch S2 is closed and resistor R2 is connected across the CAN_L connection 35 and CAN_H connection 37 in the motorcycle.

When referring to the values of the resistors R1, R2 the values given are nominal and the actual value may vary by up to 5% from its nominal value, which is the tolerance required for the CAN bus. When a chain of motorcycles is connected, the resistance between the resulting network of CAN_L and CAN_H wires is 60 ohms, as required by the CAN bus protocol.

Referring back to FIG. 3, the pushbutton 25, socket 22 and body 21 of the connector 20 may be wired and configured in the same way as the socket and the motorcycle shown in FIGS. 4-5.

Figure 6:
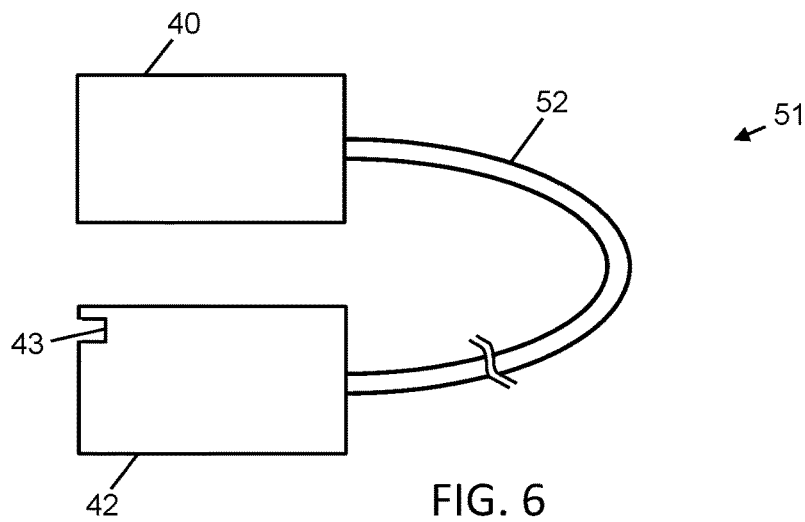
FIG. 6 is a schematic diagram of a parallel charging cable, according to an embodiment of the present invention.

Referring now to FIG. 6, an exemplary parallel charging cable (hereinafter "cable" for brevity) 51 is shown. The cable 51 is used, for example, to connect two electric motorcycles together so that they can charge in parallel. The cable 51 has an electrical cord 52 that terminates with plugs 40, 42, which may be identical apart from the notch 43 in plug 42. Each of the plugs 40, 42, mates with the sockets 22, 24 in two separate connectors 20, the two connectors being plugged into the two connected motorcycles. The plug 40 also mates with a socket in a motorcycle. One cable 51 and one connector are carried by each rider wanting to take advantage of parallel motorcycle charging.

Figure 7:
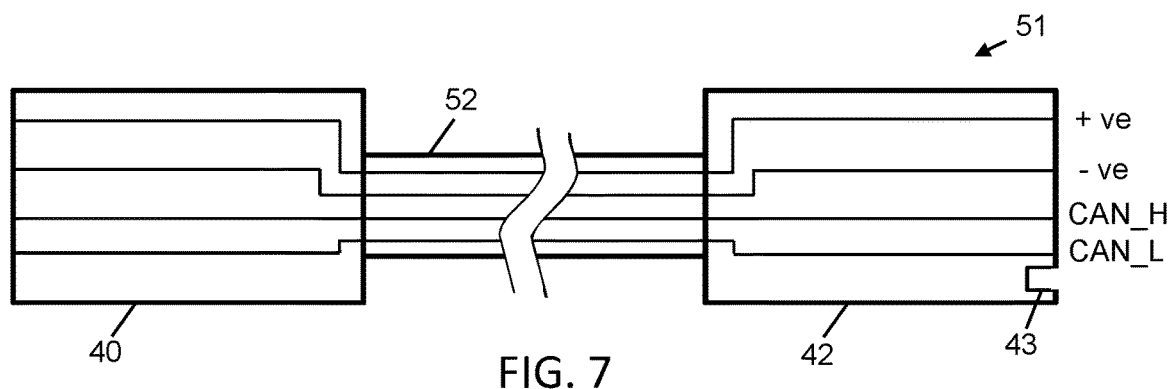
FIG. 7 is a wiring diagram of a parallel charging cable, according to an embodiment of the present invention.

FIG. 7 shows the wiring diagram for the cable 51. Positive terminals in each plug 42 are connected directly to each other via the electrical cord 52. Negative terminals in each plug are also connected directly to each other. The CAN_H terminals in each plug are connected directly to each other. The CAN_L terminals in each plug are also connected directly to each other.

In other embodiments, the switches S2 in the motorcycles 10, 12, 14 and/or the switches S1 in the connectors 20 may be controlled automatically rather than by mechanical action of inserting a plug. For example, they may be operated electrically, electronically or by other mechanical arrangements, or via the use of sensors.

Figure 8:
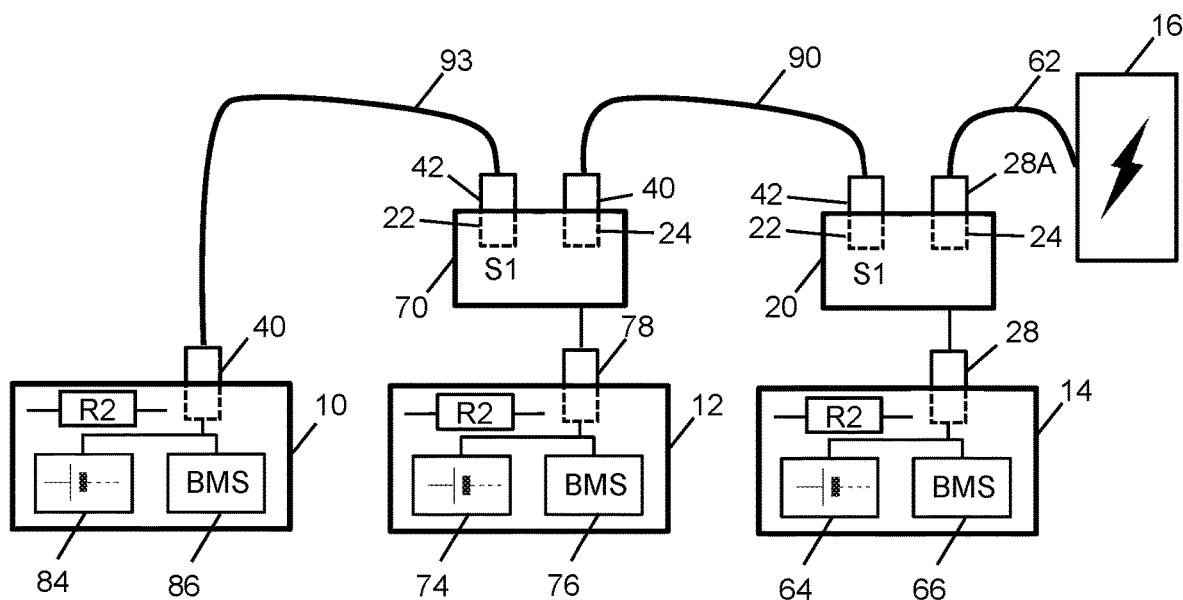
FIG. 8 is a schematic diagram of multiple motorcycles connected with multiple parallel charging modules and parallel cables to a single charger, according to an embodiment of the present invention.

Referring to FIG. 8, a chain of three motorcycles is shown symbolically in a parallel charging chain. The first motorcycle 14 in the chain is connected to connector 20 via plug 28, which plugs into the motorcycle 14. Motorcycle 14 has a battery 64 and BMS 66, and CAN termination resistor R2. The first motorcycle 14 may be referred to as the manager motorcycle, and is at the end of the chain of motorcycles to be charged, connected immediately to the charger. The second motorcycle 12 in the chain is connected to connector 70 via plug 78, which plugs into the second motorcycle 12. Second motorcycle 12 has a battery 74 and BMS 76, and CAN termination resistor R2. The third motorcycle 10 in the chain is connected to connector 70 via plug 40 and cable 93. The third motorcycle 10 has a battery 84 and BMS 86, and CAN termination resistor R2.

The connector 20 is connected directly to the charging station 16. A plug 28A at the end of cable 62 extending from the charging station is plugged into the connector 20 at socket 24. A cable 90 (a parallel charging cable) is plugged into socket 22 of the connector 20 via plug 42 at one end of the cable 90. The cable 90 is also plugged into socket 24 of the connector 70 via plug 40 at the other end of the cable 90. The connector is connected to the third motorcycle 10. A cable 93 is plugged into socket 22 of the connector 70 via plug 42 at one end of the cable 93. The cable 93 is also plugged into the third motorcycle 10 via plug 40 at the other end of the cable 93.

Additional motorcycles may be connected in the chain using one or more additional connectors 20 and cables 51.

As connected, there is a CAN termination resistor in the charging station 16, and another termination resistor connected across the CAN_L and CAN_H connections within the connected chain of motorcycles. In this example, plugs 28, 78 keep the termination resistor R2 open circuit in the motorcycles 14, 12 respectively. Plugs 42 on cables 90, 93 keep the termination resistor R1 open circuit in connectors 20, 70 respectively. Plug 40 of cable 93 ensures that the R2 in motorcycle 10 is connected across the CAN_L and CAN_H connections in motorcycle 10. When a chain of motorcycles is connected in this way, the resistance between the CAN_L and CAN_H wires is 60 ohms due to the presence of two 120 ohm resistors in parallel.

In other embodiments, the motorcycle with the highest charge from the three motorcycles 10, 12, 14 is determined to be the manager motorcycle. This is determined by communications between the three motorcycles after they are all connected to each other, or to each other and the charger. Each motorcycle broadcasts its identity and charge level on the CAN bus, and the one with the highest charge is assigned the manager role.

Figure 9:
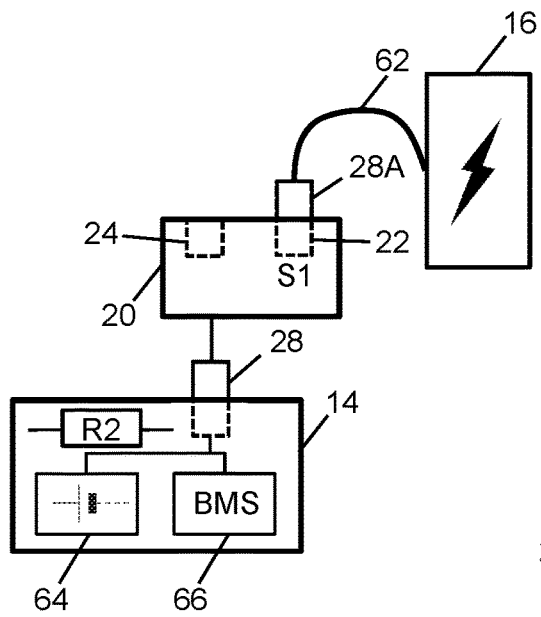
FIG. 9 is a schematic diagram of a single motorcycle connected to a charger and able to connect to another motorcycle, according to an embodiment of the present invention.

Referring to FIG. 9, a first motorcycle 14 is connected to the charging station 16 via connector 20 and plug 28, which plugs into the motorcycle 14. Charging station plug 28A is plugged into socket 22 of the connector 20, to close switch S1 and connect CAN bus termination resistance R1 in the connector. Motorcycle 14 has a battery 64 and BMS 66, and CAN termination resistor R2, which is open circuit due to the insertion of the plug 28 of the connector. A second motorcycle may be connected to connector 20 via socket 24. However, it is not necessary in this scenario to connect a second motorcycle, and the first motorcycle can charge as it is shown.

When a second motorcycle is connected, the end 40 of the cable 51 that is used to connect the second motorcycle to the connector 20 should be plugged into the motorcycle. End 40 of the cable 51 is plugged into socket 24 of the connector 20. By inserting end 42 of the cable 51 into the second motorcycle, the resistor R2 in the second motorcycle is left open circuit. The resistor R1 in the connector 20 remains connected across the CAN bus connections.

Figure 10:
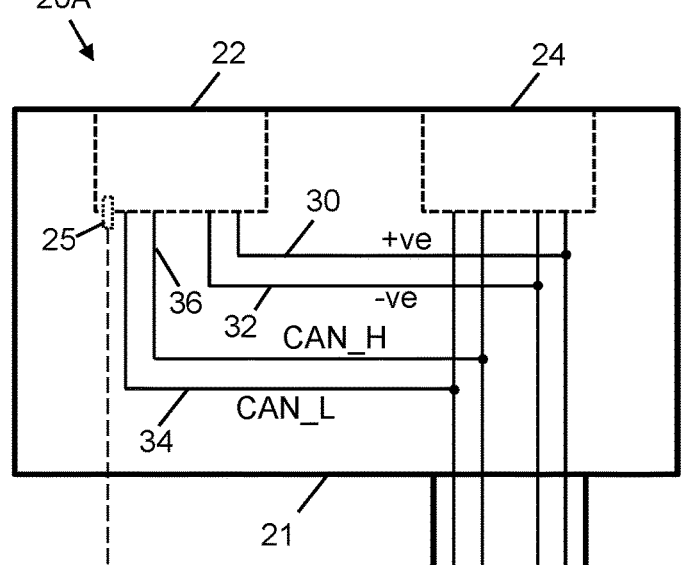
FIG. 10 is a wiring diagram of another parallel charging module, according to an embodiment of the present invention.
Figure 10:
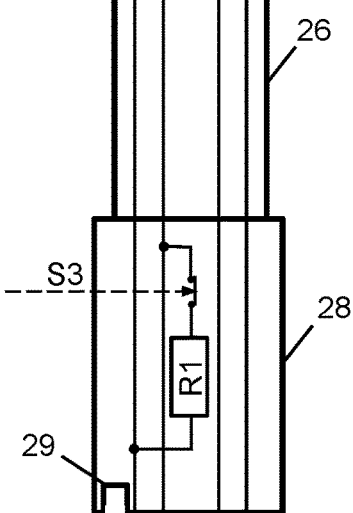

In another embodiment, FIG. 10 symbolically shows the internal wiring within the body 21, cable 26 and plug of the connector 20A. An electrical connection 30 connects the positive terminals of both of the sockets 22, 24 to each other and to the positive terminal of the plug 28. Another electrical connection 32 connects the negative terminals of both of the sockets 22, 24 to each other and to the negative terminal of the plug 28. Another electrical connection 34 connects the CAN_L terminals of both of the sockets 22, 24 to each other and to the CAN_L terminal of the plug 28. Another electrical connection 36 connects the CAN_H terminals of both of the sockets 22, 24 to each other and to the CAN_H terminal of the plug 28. As such, the connector 20 may be considered to be a three-way connector. Notch 29 is described above. Also present is a 120 ohm resistor R1 connected across the CAN_L and CAN_H wires via switch S3 operated by pushbutton 25. The switch S3 is normally closed, and when the pushbutton is activated the switch S3 opens the connection of R1 across the CAN_L and CAN_H wires.

Figure 11:
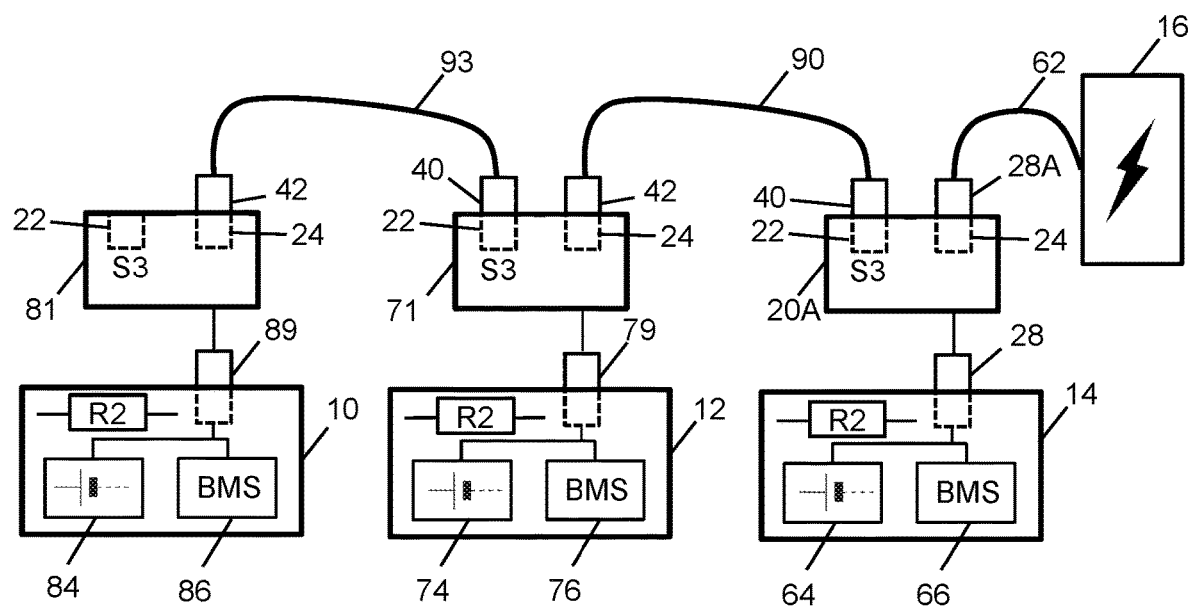
FIG. 11 is a schematic diagram of multiple motorcycles connected with multiple parallel charging modules and parallel cables to a single charger, according to another embodiment of the present invention.

Referring to FIG. 11, a chain of three motorcycles is shown symbolically in a parallel charging chain using connectors 20A. The first motorcycle 14 in the chain is connected to connector 20A via plug 28, which plugs into the motorcycle 14. Motorcycle 14 has a battery 64 and battery management system (BMS) 66, and CAN termination resistor R2. The first motorcycle 14 may be referred to as the manager motorcycle, and is at the end of the chain of motorcycles to be charged, connected immediately to the charger. The second motorcycle 12 in the chain is connected to connector 71 via plug 79, which plugs into the second motorcycle 12. Second motorcycle 12 has a battery 74 and BMS 76, and CAN termination resistor R2. The third motorcycle 10 in the chain is connected to connector 71 via connector 81, plug 40 and cable 93. The third motorcycle 10 has a battery 84 and BMS 86, and CAN termination resistor R2.

The connector 20A is connected directly to the charging station 16. A plug 28A at the end of cable 62 extending from the charging station is plugged into socket 24 of the connector 20A. A cable 90 (a parallel charging cable) is plugged into socket 22 of the connector 20A via plug 40 at one end of the cable 90. The cable 90 is also plugged into socket 24 of the connector 71 via plug 42 at the other end of the cable 90. The connector 71 is connected to the third motorcycle 10. A cable 93 is plugged into socket 22 of the connector 71 via plug 40 at one end of the cable 93. The cable 93 is also plugged into socket 24 of the connector 81 via plug 42 at the other end of the cable 93. The connector 81 is connected to the third motorcycle 10 via plug 89.

Additional motorcycles may be connected in the chain using one or more additional connectors 20A and cables 51.

As connected, there is a CAN termination resistor in the charging station 16, and another termination resistor connected across the CAN_L and CAN_H connections within the connected chain of motorcycles. In this example, plugs 28, 79, 89 keep the termination resistor R2 open circuit in the motorcycles 14, 12, 10 respectively. Plugs 40 on cables 90, 93 activate the pushbutton in sockets 22 so that the termination resistor R1 is open circuit in connectors 20A, 71 respectively. Plug 42 of cable 93 does not affect the switch S3 in connector 81, and absence of a plug in socket 22 of connector 81 ensures that resistor R1 in connector 81 is connected across the CAN_L and CAN_H connections in the connector 81. When a chain of motorcycles is connected in this way, the resistance between the CAN_L and CAN_H wires is 60 ohms due to the connection of two 120 ohm resistors in parallel.

Figure 12:
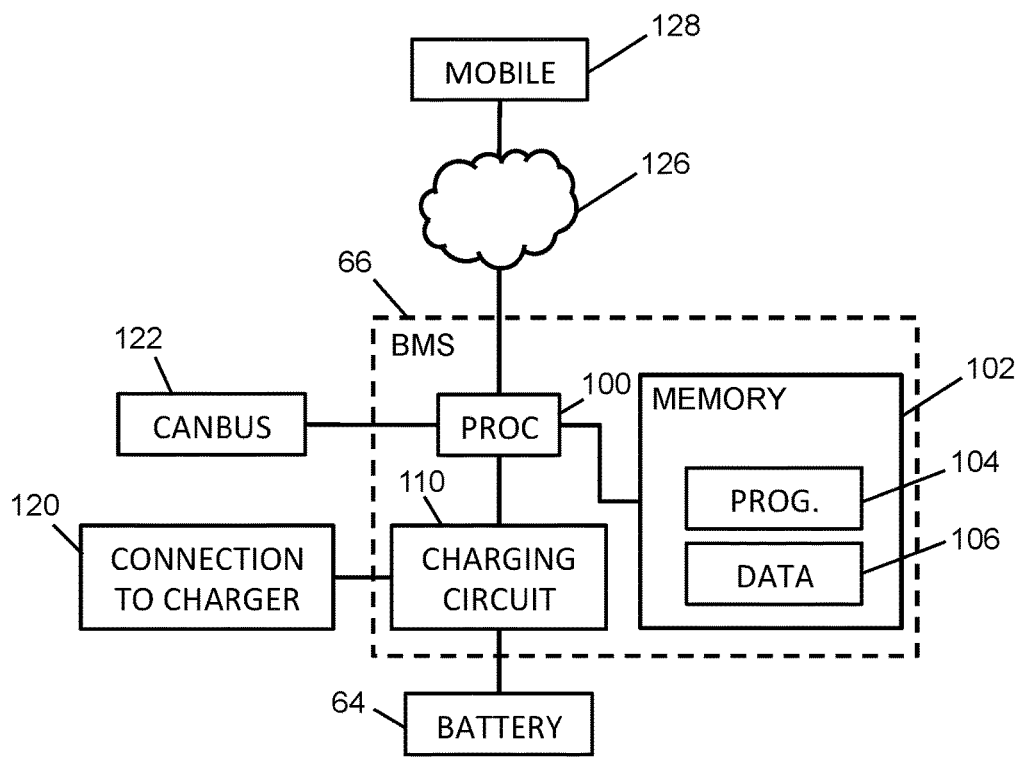
FIG. 12 is a block diagram of electronic components of a motorcycle, according to an embodiment of the present invention.

Referring to FIG. 12, a block diagram of a BMS 66 in motorcycle 14, for example, is shown. The BMS 66 is connected to battery 64 for controlling the rate and duration of the charging of the battery when it is connected to a charger. The BMS 66 includes one or more processors 100 which are operably connected to non-transitory computer readable memory 102. The BMS 66 includes computer readable instructions 104 (e.g. a program or an application) stored in the memory 102 and computer readable data 106, also stored in the memory. The memory 102 may be divided into one or more constituent memories, of the same or different types. The BMS 66 includes a charging circuit 110, operably connected to the processor(s) 100. The BMS 66 is also connected to a connection 120 that serves as an interface to a charger. The processor(s) 100 are also connected to wiring of a CAN bus 122 in order to send and receive instructions for controlling the BMS 66 and communicating with other motorcycles. The processor(s) 100 may also by connected to another CAN bus for controlling the BMS 66 when disconnected from the other motorcycles. If the motorcycle is a manager motorcycle, then the processor may additionally send instructions to the other motorcycles in the parallel charging chain via the CAN bus 122.

The BMS 66 may also be connected to other components of the motorcycle, such as other electronic control units or a hybrid engine control unit via one or more interfaces.

Some or all of the computer readable instructions 104 and computer readable data 106 provide the functionality of the BMS 66 when executed or read by the processor(s) 100. Computer readable instructions may be broken down into blocks of code or modules.

The BMS 66 may be connected via a wireless communications network 126 to a rider's mobile electronic device 128. This device 128 may run a mobile application that monitors or controls the BMS 66. The mobile application may be programmed, for example, to monitor the charge status of the motorcycle. The mobile application is run by a processor that executes computer readable instructions stored in a memory in the rider's mobile electronic device. The mobile application may have visibility as to the other motorcycles connected in the chain, and may be aware of and display their states of charge, for example. The mobile application may be programmed, for example, to control the minimum and maximum charge level or charging rate of the motorcycle. The mobile application may also be programmed to change the charging priority of one or more of the motorcycles in the chain. The mobile application may also be programmed to change which of the motorcycles is the manager motorcycle.

Figure 13:
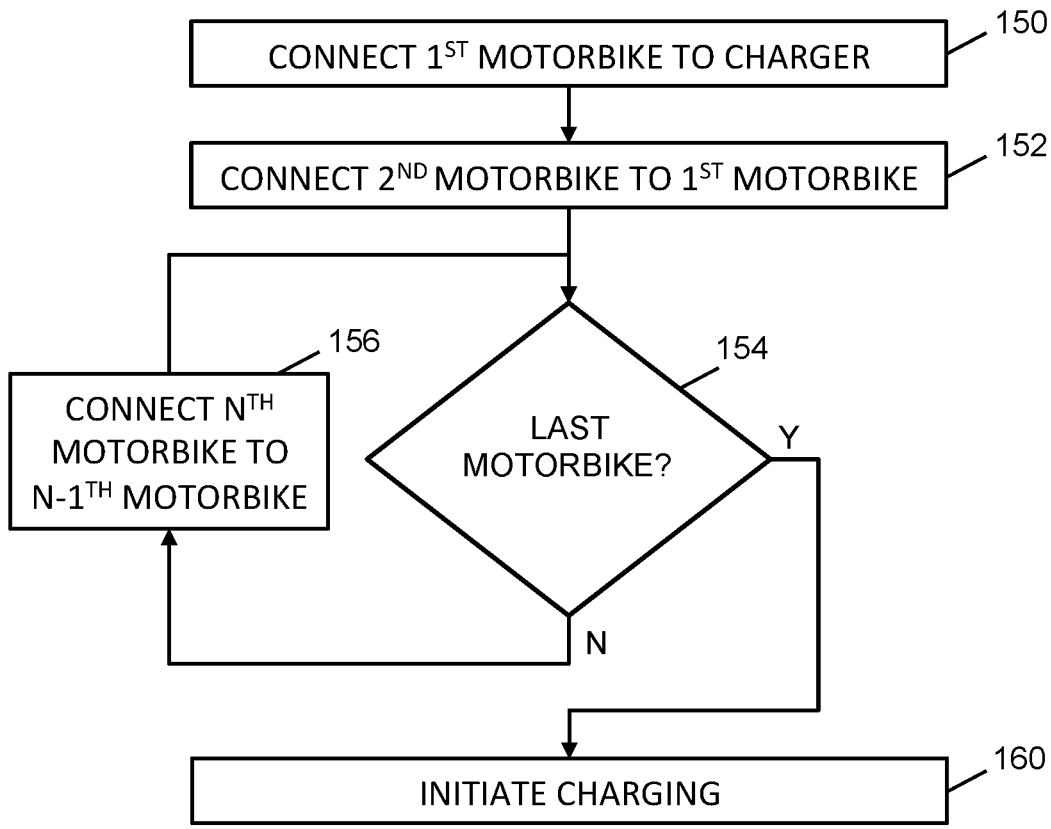
FIG. 13 is a flowchart that motorcycle riders follow in accordance with some implementations of the present invention.

FIG. 13 illustrates a process of how multiple motorcycles may be connected in parallel to the same charging station. In step 150, the first motorcycle 14 (FIG. 8) is connected to the charging station 16 using a connector 20. Whichever motorcycle is the motorcycle to be connected closest to the charging station, it becomes the first or manager motorcycle. In step 152, a second motorcycle 12 is connected to the first motorcycle 14 (using its own connector 70 if there are more motorcycles), and its own cable 90.

If, in step 154, there are more motorcycles to be connected then, in step 156, the $N^{th}$ motorcycle is connected to the $(N-1)^{th}$ motorcycle, where N=3, 4, . . . up to as many motorcycles as there is room for and without overloading the charging station. The process cycles around steps 156 and 154 until there are no more motorcycles to be added to the chain. The last motorcycle does not need to use its connector to connect, just its cable. In step 160, charging is initiated.

Figure 14:
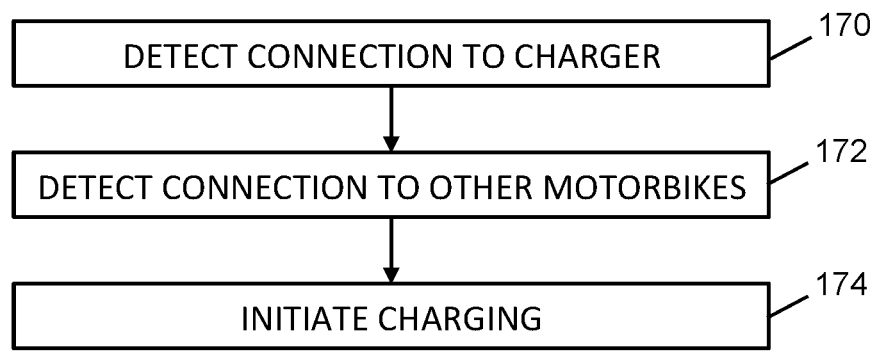
FIG. 14 is a flowchart that the manager motorcycle follows in accordance with some implementations of the present invention.

Referring to FIG. 14, after the motorcycles are all connected to the charging station, the manager motorcycle detects its connection to the charging station, in step 170, and to the other motorcycles, in step 172. After the manager motorcycle has become aware of all the motorcycles that are connected to it, and therefore connected to the charging station, the manager motorcycle initiates the charging in step 174. To initiate charging, the manager motorcycle sends a signal to the charging station to cause it to energize the positive and negative terminals in the plug of the charging station. When these current-supplying terminals are energized, current is available immediately to all motorcycles in the chain due to the connections of positive and negative wiring throughout the network of connected cables and connectors.

The manager motorcycle learns of the other motorcycles that are connected into the parallel charging chain via communications between the motorcycles using the CAN bus protocol. Each motorcycle manages its own state of charge and its own charging rate. When a particular motorcycle in the chain is sufficiently charged, its BMS disconnects it from the chain, while still allowing charging current to pass through its connector, if necessary, for continuing to charge other motorcycles in the chain. By allowing each individual motorcycle to control its own charging (after initiation by the manager motorcycle), then the BMS of each individual motorcycle can protect its battery from overcharging.

The manager motorcycle may instruct each of the motorcycles in the chain as to the maximum amount of current that they can draw, in order to distribute the current evenly between the motorcycles. Parallel charging functionality is built into the motorcycles, so that they can each accept an instruction from a manager motorcycle to charge at a lower rate than might otherwise be expected. In other embodiments, the current drawn may be timer-based, in which the full current is drawn cyclically in turn by each motorcycle on a time scale synchronized with all motorcycles in the chain, for equal periods. For example, each motorcycle may in turn draw full current for 5 minutes at a time.

The current distribution may be controlled by the mobile application for each motorcycle. In one example, if three riders are in a group and they would like all charging to be complete at the same time then they can enable this in the mobile application and the charge supervisor (i.e. manager motorcycle) will then adjust the amount of current delivered to each bike accordingly. In another example, the rider of each motorcycle can set an individual charge priority on the rider's mobile application and the charge supervisor can negotiate with this individual motorcycle if this is possible, by providing the best estimated charge completion time possible, given the priority of the other motorcycles that are plugged into the system prior to this motorcycle.

For convenience, without being obligatory, the motorcycle that needs the most charge should be connected first to the charger. The remaining motorcycles should then be connected in descending order of the amount of charge they need. This ensures that the motorcycles on the far end from the charger can disconnect and move away from the parallel chain when fully charged without breaking the charging circuit for the remaining motorcycles. When connected in this way, a situation is avoided in which a middle motorcycle becomes fully charged and the rider wishes to remove it from the chain and ride off. However, if a middle motorcycle is removed during charging or the other motorcycles and then the connection between the remaining motorcycles is remade, then charging of the remaining motorcycles continues.

Figure 15:
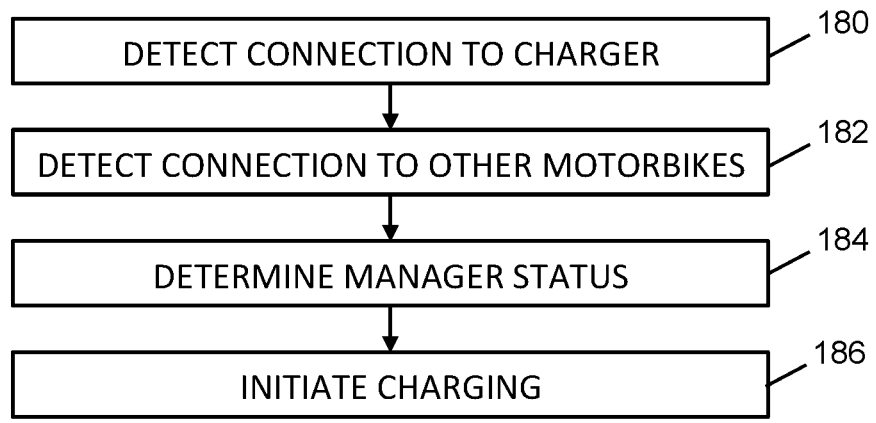
FIG. 15 is a flowchart a manager motorcycle follows in determining its status as a manager motorcycle, in accordance with some implementations of the present invention.

FIG. 15 relates to the embodiment in which the motorcycles negotiate between themselves as to which is to become the manager motorcycle. After the motorcycles are all connected to the charging station, the motorcycles detect that they have been connected to the charging station, in step 180. In step 182, the motorcycles start to broadcast their identities on the CAN bus shortly after they have been connected to the charger and each other. Each motorcycle detects that a charger cable has been plugged in, and in response, starts to authenticate itself on the CAN bus. In doing so, each motorcycle detects its connection to the other motorcycles in the chain.

In step 184, the motorcycles negotiate which of them is to become the manager motorcycle. After the manager motorcycle has been determined and has become aware of all the motorcycles that are connected to it and therefore connected to the charging station, the manager motorcycle initiates the charging in step 186. Depending on the embodiment, the maximum number of motorcycles allowed in the chain may be fixed. In this case, the manager motorcycle will know that the chain is complete if the maximum number (a predetermined limit) of motorcycles are connected in the chain. In other embodiments, there is a timeout that is set, which marks completion of the chain. The timeout triggers when no additional motorcycles are detected in the chain within a predetermined time interval starting from when the last motorcycle was connected. The completion of the chain may be based on a combination of reaching a maximum number of motorcycles in the chain and the timeout, whichever occurs first. The timeout period may be, for example, one minute.

To initiate charging, the manager motorcycle sends a signal to the charging station to causes it to energize the positive and negative terminals in the plug of the charging station. When these current-supplying terminals are energized, current is available immediately to all motorcycles in the chain due to the connections of positive and negative wiring throughout the network of connected cables and connectors. If another motorcycle is then added to the chain after charging has started, then it authenticates itself to the manager motorcycle. If authentication is successful, then the manager motorcycle manages the charge supplied to the added motorcycle.

The manager motorcycle learns of the other motorcycles that are connected into the parallel charging chain via communications between the motorcycles using the CAN bus protocol. Each motorcycle manages its own state of charge and its own charging rate. The CAN bus connections are needed during the charging process to allow for communications between the motorcycles. If the CAN bus connections fail for any reason, then a back-up wireless communication technology may be used, such as via the mobile electronic devices 128 of the riders, or via a Bluetooth™ communication protocol between the motorcycles directly.

Figure 16:
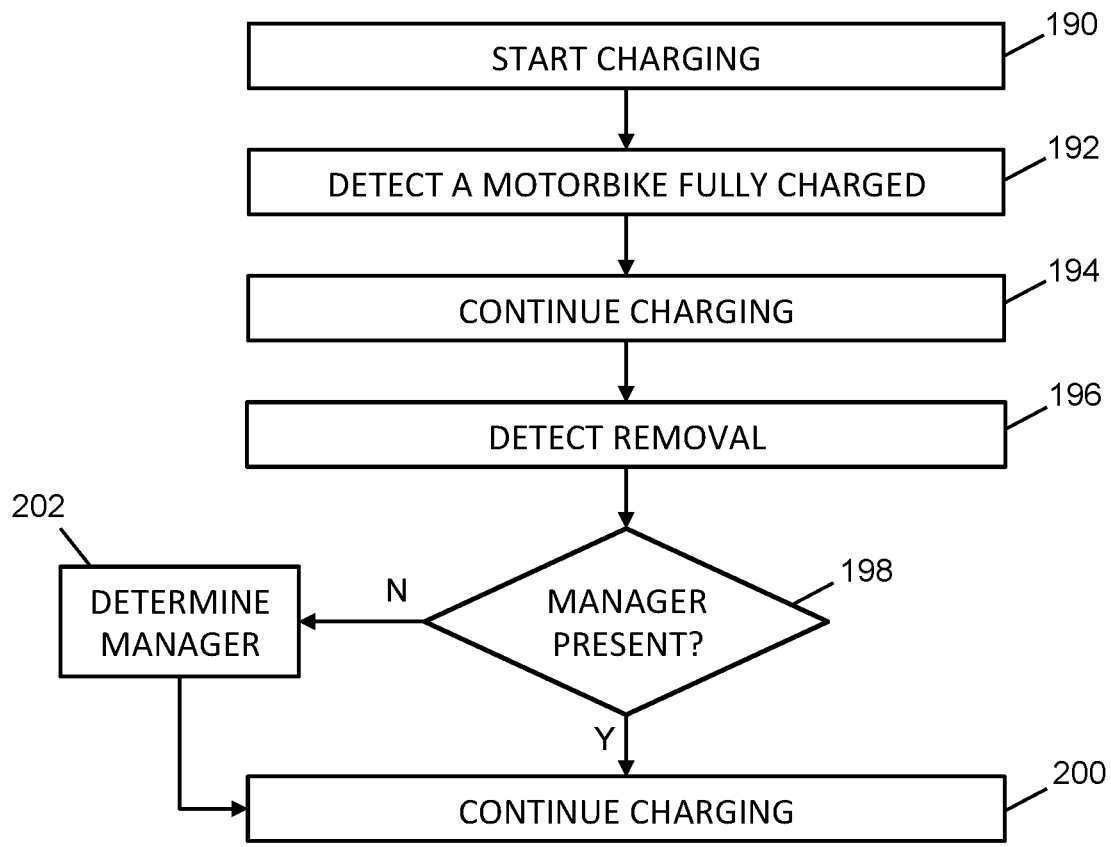
FIG. 16 is a flowchart for when a motorcycle is disconnected from the chain, in accordance with some implementations of the present invention.

Referring to FIG. 16, a flowchart is shown for when a motorcycle finishes charging or is disconnected from the chain during charging. In step 190, the system starts charging the motorcycles in the chain. In step 192, the manager motorcycle detects that one of the motorcycles has finished charging, as the case may be. In step 194, the motorcycles that are not yet fully charged continue to be charged. In step 196, one of the motorcycles is removed from the chain. It may be a motorcycle that is fully charged or one that is partially charged. In step 198, the remaining motorcycles determine whether the manager motorcycle is still present. If the manager motorcycle is still present, then charging of the remaining motorcycles continues in step 200. If there is no manager present, then the remaining motorcycles negotiate which one of them is to take over the manager role, in step 202. This may be done as before, by determining which of the motorcycles presently has the least charge. In other embodiments, it may be done by having all the motorcycles initially assigned a priority of being the manager motorcycle. When the motorcycle of priority 1, initially designated the manager motorcycle, is disconnected from the chain, then the motorcycle with priority 2 automatically becomes the manager motorcycle, if it is still present, and so on.

C. Variations

In other embodiments, the sockets 22, 24 may have other differences besides the pushbutton. At least one of the sockets 22, 24 should match with the plug that is provided as part of the charging station 16. Both of the sockets 22, 24 should mate with one or both ends of the parallel charging cable. The parallel charging cable may have plugs with other differences besides the notch. One of the plugs on the parallel charging cable may be the same as that of the charging station. Markings may be present on the plugs of the parallel charging cable and the connectors to show how they should be connected.

In other embodiments, the pushbutton 25 may be replaced with another mechanism or control for selectively operating the switch for the terminal resistor.

In some embodiments, the two sockets 22, 24 are built into the motorcycle and connected internally in the motorcycle to what would have been a single charging socket. As such, there is no need for the connector 20 as a separate module. In these embodiments, the switch S2 in the motorcycle is normally closed, and the insertion of a cable that connects another motorcycle causes S2 to open.

In other embodiments, protocols other than the CAN bus protocol may be used, such as a PLC protocol. If a PLC protocol is used, then the CAN_L and CAN_H communication lines are not necessary. Also, for example, Bluetooth™, Bluetooth Low Energy™, Wi-Fi™, or cellular protocols may be used instead of the tethered, CAN system. Instead of S1, S2, S3, R1, R2 the plugs and connectors are fitted, if necessary, with the electronic components and switches required for the other protocols.

In some embodiments, the system is designed for a chain of exactly two motorcycles to be charged together.

If the motorcycles arrive at different times at the charging station, then the first motorcycle connects directly to the charging station. The second motorcycle to arrive connects using its connector and cable. Subsequent motorcycles arriving follow the same pattern.

There may be a feature in socket 22, such as a stop, which prevents the insertion of the charging plug cable. Plugs 42 that are intended to be inserted into socket 22 may have a portion removed corresponding to the stop.

Throughout the description, specific details have been set forth in order to provide a more thorough understanding of the invention. However, the invention may be practiced without these particulars. In other instances, well known elements have not been shown or described in detail and repetitions of steps and features have been omitted to avoid unnecessarily obscuring the invention. Accordingly, the specification is to be regarded in an illustrative, rather than a restrictive, sense.

The detailed description has been presented partly in terms of methods or processes, symbolic representations of operations, functionalities and features of the invention. These method descriptions and representations are the means used by those skilled in the art to most effectively convey the substance of their work to others skilled in the art. A software implemented method or process is here, and generally, understood to be a self-consistent sequence of steps leading to a desired result. These steps require physical manipulations of physical quantities. Often, but not necessarily, these quantities take the form of electrical or magnetic signals or values capable of being stored, transferred, combined, compared, and otherwise manipulated. It will be further appreciated that the lines between hardware, firmware and software are not always sharp, it being understood by those skilled in the art that the software implemented processes described herein may be embodied in hardware, firmware, software, or any combination thereof. Such processes may be controlled by coded instructions such as microcode and/or by stored programming instructions in one or more tangible or non-transient media readable by a computer or processor. The code modules may be stored in any computer storage system or device, such as hard disk drives, optical drives, solid state memories, etc. The methods may alternatively be embodied partly or wholly in specialized computer hardware, such as ASIC or FPGA circuitry.

It will be clear to one having skill in the art that further variations to the specific details disclosed herein can be made, resulting in other embodiments that are within the scope of the invention disclosed. Two or more steps in the flowcharts may be performed in a different order, other steps may be added, or one or more may be removed without altering the main function of the invention. Some steps shown may occur in parallel. Flowcharts from different figures may be combined in different ways. Modules may be divided into constituent modules or combined into larger modules. All configurations described herein are examples only and actual ones depend on the specific embodiment. Accordingly, the scope of the invention is to be construed in accordance with the substance defined by the following claims.

The invention claimed is:

1. A parallel charging module for an electric motorcycle comprising:
   a plug, a first socket and a second socket, wherein each of the plug, the first socket and the second socket has a positive terminal, a negative terminal, a first communication terminal and a second communication terminal;
   a first electrical connection between the positive terminals of the plug, the first socket and the second socket;
   a second electrical connection between the negative terminals of the plug, the first socket and the second socket;
   a third electrical connection between the first communication terminals of the plug, the first socket and the second socket;
   a fourth electrical connection between the second communication terminals of the plug, the first socket and the second socket; and
   a switch and a 120 ohm resistor connected in series across the third and fourth electrical connections;
   wherein:

the plug is configured to mate with a charging socket on the electric motorcycle;

the first socket is configured to mate with a charging station plug; and the switch is operated depending on a type of plug inserted in the second socket.

2. The parallel charging module of claim 1 wherein the switch is normally open.

3. The parallel charging module of claim 1 wherein the switch is normally closed.

4. The parallel charging module of claim 1 wherein the switch is operated by a pushbutton in the second socket.

5. The parallel charging module of claim 1 wherein the first and second communication terminals are Controller Area Network terminals.

6. The parallel charging module of claim 1 wherein the switch is electronically operated.

7. The parallel charging module of claim 1 wherein the switch is operated by a first type of plug and not by a second type of plug.

8. The parallel charging module of claim 7, wherein:
the second type of plug defines a notch that is not present in the first type of plug; and
a control for the switch fits inside the notch without the switch being operated.

9. The parallel charging module of claim 7 in combination with a parallel charging cable, wherein the parallel charging cable comprises:
two further plugs, each one located at an end of the parallel charging cable, wherein each of the further plugs has a further positive terminal, a further negative terminal, a further first communication terminal and a further second communication terminal;
a fifth electrical connection between the further positive terminals of the two further plugs;
a sixth electrical connection between the further negative terminals of the two further plugs;
a seventh electrical connection between the further first communication terminals of the two further plugs; and
an eighth electrical connection between the further second communication terminals of the two further plugs;
wherein the two further plugs comprise one of the first type and one of the second type.

10. A system for charging multiple electric motorcycles in parallel comprising a parallel charging module for each motorcycle and a parallel charging cable for each motorcycle; wherein each parallel charging module comprises:
a plug, a first socket and a second socket, wherein each of the plug, the first socket and the second socket has a positive terminal, a negative terminal, a first communication terminal and a second communication terminal;
a first electrical connection between the positive terminals of the plug, the first socket and the second socket;
a second electrical connection between the negative terminals of the plug, the first socket and the second socket;
a third electrical connection between the first communication terminals of the plug, the first socket and the second socket;
a fourth electrical connection between the second communication terminals of the plug, the first socket and the second socket; and
a switch and a 120 ohm resistor connected in series across the third and fourth electrical connections;
wherein:
the plug is configured to mate with a charging socket on the electric motorcycle;
the first socket is configured to mate with a charging station plug; and
the switch is operated depending on a type of plug inserted in the second socket;
wherein each parallel charging cable comprises:
two further plugs, each one located at an end of the parallel charging cable, wherein each of the further plugs has a further positive terminal, a further negative terminal, a further first communication terminal and a further second communication terminal;
a fifth electrical connection between the further positive terminals of the two further plugs;
a sixth electrical connection between the further negative terminals of the two further plugs;
a seventh electrical connection between the further first communication terminals of the two further plugs; and
an eighth electrical connection between the further second communication terminals of the two further plugs;
wherein the two further plugs comprise one of a first type that operates the switch and one of a second type that does not operate the switch.

11. The system of claim 10 comprising a pushbutton in the second socket that operates the switch.

12. The system of claim 10 wherein all the communication terminals are Controller Area Network terminals.

13. The system of claim 10 wherein the switch is electronically operated.

14. The system of claim 10 comprising:
one or more processors; and
computer-readable memory storing computer-readable instructions, which, when executed by the one or more processors, cause the system to:
detect connection of the motorcycles to each other and to the charging station plug; and
manage charging of the motorcycles.

15. The system of claim 14, wherein the computer-readable instructions, when executed by the one or more processors, further cause the system to:
prevent further motorcycles from connecting to the motorcycles after a predetermined period of time;
prevent further motorcycles from connecting to the motorcycles after a predetermined limit of a number of motorcycles have been connected;
select one of the motorcycles to be a manager motorcycle;
assign a priority to each motorcycle to be the manager motorcycle;
initiate charging of the motorcycles;
detect when one of the motorcycles has disconnected from the remaining motorcycles; or
initiate continuation of the charging after one of the motorcycles has disconnected from the remaining motorcycles.

16. The system of claim 14 comprising multiple wireless communication interfaces, wherein the computer-readable instructions, when executed by the one or more processors, further cause:
communications between the motorcycles to continue via wireless connections when the communications are not possible via the parallel charging modules and the parallel charging cables.

17. The system of claim 14 comprising a mobile communications device with:
a further processor; and
further computer-readable memory storing further computer-readable instructions, which, when executed by the further processor, cause the system to control at least one aspect of the charging.

\* \* \* \* \*